United States Patent [19]

Strybel

[11] 3,870,432
[45] Mar. 11, 1975

[54] TUBE WORKING TOOL
[75] Inventor: Richard V. Strybel, Elk Grove Village, Ill.
[73] Assignee: Imperial-Eastman Corporation, Chicago, Ill.
[22] Filed: Oct. 15, 1973
[21] Appl. No.: 406,308

[52] U.S. Cl. ............... 408/191, 408/211, 408/228
[51] Int. Cl. ...................... B23d 79/02, B23b 5/16
[58] Field of Search ........... 408/211, 198, 202, 216, 408/223, 193, 228, 231

[56] References Cited
UNITED STATES PATENTS

| | | | |
|---|---|---|---|
| 2,242,821 | 5/1941 | Fanslon | 408/231 X |
| 2,517,062 | 8/1950 | Vosper | 408/198 |
| 2,748,631 | 6/1956 | Neale | 408/211 X |
| 3,020,787 | 2/1962 | Cusick | 408/211 X |
| 3,232,145 | 2/1966 | Wilson | 408/202 |
| 3,550,482 | 12/1970 | Lee | 408/228 |
| 3,763,510 | 10/1973 | Graham | 408/211 X |

Primary Examiner—Andrew R. Juhasz
Assistant Examiner—W. R. Briggs
Attorney, Agent, or Firm—Hofgren, Wegner, Allen, Stellman & McCord

[57] ABSTRACT

A combination reamer and deburring tool for use in reaming and deburring the cut end of a tube, such as a metal tube. The tool includes a pair of coacting cutters which are coaxially spaced by resilient biasing means permitting the tube end to be urged coaxially against one of the cutters to engage the cut end thereof exteriorly with the engaged cutter and interiorly with the other cutter and permit subsequent relative rotation between the tube and tool to effect a concurrent reaming and deburring operation.

15 Claims, 6 Drawing Figures

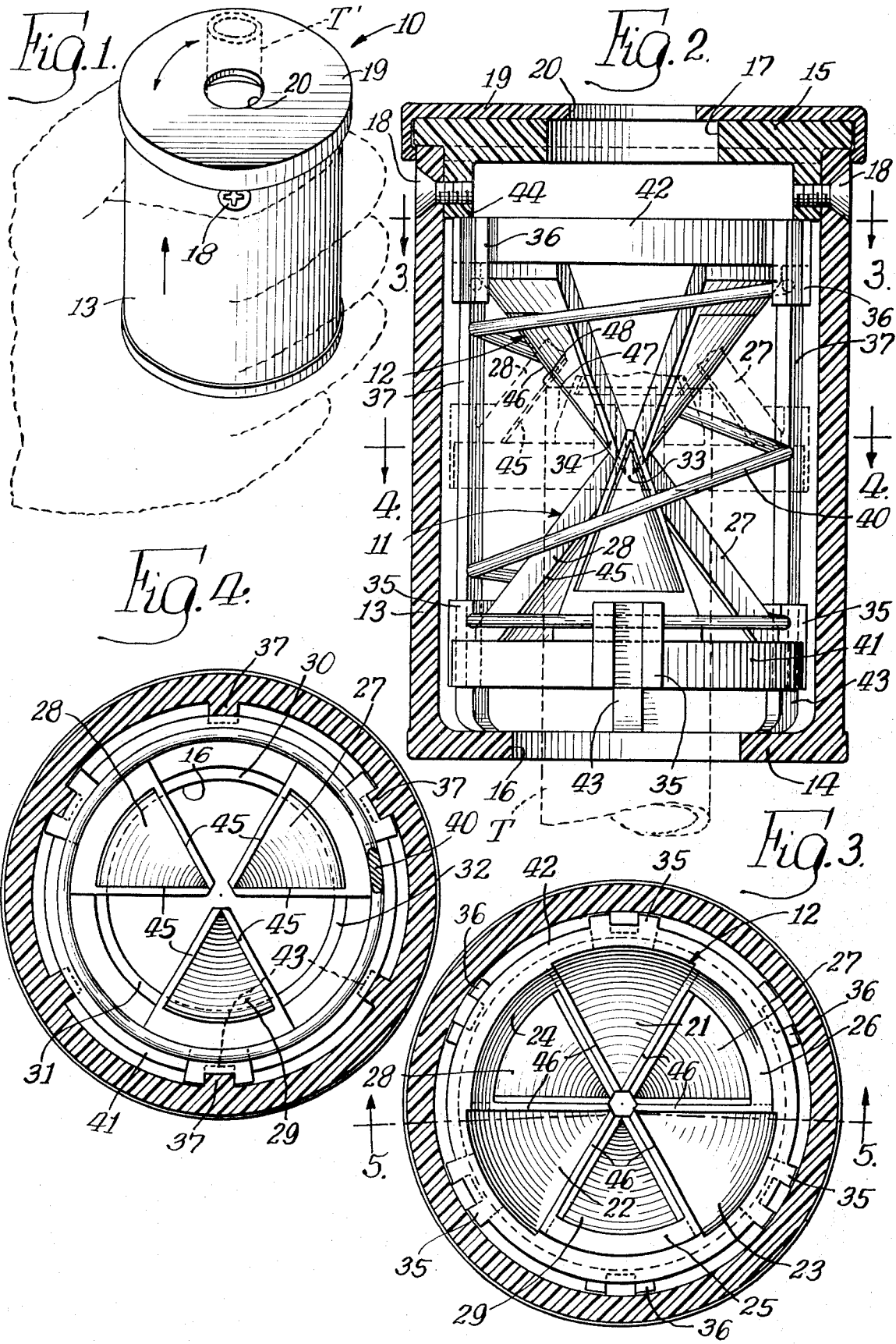

TUBE WORKING TOOL

BACKGROUND OF THE INVENTION

1. Field of the Invention

This invention relates to tube working tools, and in particular to tools for reaming and deburring the cut end of a tube.

2. Description of the Prior Art

It is conventional in the tube working art to ream the inner edge of the cut end of a metal tube or the like to remove any sharp pieces of metal or notches so as to provide an improved surface for connection of the tube end to a fitting or other connection means. Further, it is desirable, to effect a good sealed connection, to debur the outer edge of the cut end of the tube similarly to provide a smooth, even surface for improved sealed engagement with the connection surfaces.

One tool of the prior art provided for such working of the cut end of a tube is that shown in the U.S. Letters Pat. No. of F. R. Wilson U.S. Pat. No. 3,232,145. In that patent, a hand reamer is disclosed which is adapted to debur both inner and outer surfaces of the cut end of a tube by telescoping the open end of a housing over the cut end of the tube to engage the apex of conically disposed blades within the tube end to bear against the inner cut edge. Relative coaxial rotation between the tool and tube then is effected to debur the inner cut edge. The tool is then removed and reversed so as to have the tube extend into the opposite end of the housing whereby the conical blades bear against the outer cut edge of the tube permitting a subsequent coaxial relative rotation to debur and bevel the outer cut edge.

Another form of tube end shaping apparatus is shown in the U.S. Letters Pat. No. of O. A. Neale 2,748,631 wherein a tool is provided for operating on both the inside and outside diameter of the tube so as to concurrently bevel the outer cut edge, bevel the inner cut edge, and shape the end to extend accurately normal to the axis of the tube. To this end, three cutting blades are provided which are concurrently engaged with the tube end to effect the desired forming thereof.

A number of additional tube working tools are shown in U.S. Letters Pat. Nos. 1,204,994 of H. B. Kendall; 1,499,416 of J. G. Stech; 1,563,260 of J. M. Cromley; and 2,188,584 of J. J. Tyne, which disclose compound tools.

Additional U.S. Letters Pat. Nos. which are pertinent to the present development are those of J. H. Strock 1,863,034; F. G. Brown 2,187,221; R. B. Fanslow 2,242,821; and R. J. Lee 3,550,482.

SUMMARY OF THE INVENTION

The present invention comprehends an improved tube working tool for concurrently reaming the cut edge of a tube end and deburring the outer edge thereof. In the tool of the present invention, a pair of open conical cutters are provided which are interleaved with the segmentally conical blades of one cutter moving into and outwardly from the spaces between the cutter blades of the other cutter to provide a unique concurrent reaming and deburring action on the inner and outer cut edges of the tube end.

More specifically, the present invention comprehends an improved tool for concurrently reaming the inner edge of a cut tube end and deburring the outer edge of the cut tube end including a first cutter having an open conical arrangement of a plurality of equiangular conical segments spaced equiangularly apart to define alternating first cutter blades and first spaces, a second cutter having a similar open conical arrangement of a plurality of equiangular conical segments similarly equiangularly spaced apart to define alternating second cutter blades and second cutter spaces, the cutter blades having sharp side edges, the second cutter being coaxially apposed to the first cutter with the large ends of the conical cutters outermost and offset from the first cutter about the common axis thereof to align the first cutter blades of the first cutter with the second spaces of the second cutter, and the second cutter blades of the second cutter with the first spaces of the first cutter, and resilient means urging the cutters coaxially apart while permitting a tube end urged coaxially through the large end of one cutter into engagement with the inner surfaces of the cutter blades thereof to move the one cutter into interleaved relationship with the other cutter to a position wherein the inner edge of the cut end of the tube engages the cutter blades of the other cutter, whereby coaxial relative rotation between the tube end and the tool causes concurrent reaming of the inner edge of the cut tube end by the sharp side edges of the other cutter and deburring of the outer edge of the cut tube end by the sharp side edges of the one cutter.

In the specific embodiment, the cutter blades extend 60° and are spaced equiangularly 60° apart with the cutter blades of one cutter being aligned with the spaces of the other cutter and with the tapered, narrow end of the cutters confronting each other so as to dispose the wide, large end of the conical arrangement outwardly.

The cutters may be urged apart by a coil spring extending between the large ends of the cutters, and means may be provided for limiting the outward movement between the cutters. The movement of the cutters may be guided by suitable means, and in the illustrated embodiment, the tool includes an outer housing carrying a plurality of guide portions cooperating with guide portions carried by cutters for effecting the desired coaxial relative displacement of the cutters.

The tool further includes means for guiding the tube end coaxially into engagement with the cutter blades. In the illustrated embodiment, the tube guiding means comprises wall means at one or both ends of the cutter having a guide hole of preselected diameter for slidably passing tubes of different diameters into coaxial cutting association with the cutter blades. At least one such wall may be removably associated with the cutter, and more specifically, may be arranged to have a small diameter overlying a larger diameter opening in a second wall normally maintained in association with the tool so that the tool is adapted for use with two different diameter tubes corresponding to the different diameter openings by a simple removal or installation of the outer removable wall.

Thus, the tube working tool of the present invention is extremely simple and economical of construction while yet providing the highly desirable features discussed above.

BRIEF DESCRIPTION OF THE DRAWING

Other features and advantages of the invention will be apparent from the following description taken in connection with the accompanying drawing wherein:

FIG. 1 is a perspective view of a tube working tool embodying the invention as being used in the working of a cut tube end;

FIG. 2 is an enlarged diametric section thereof with a portion of the tool as arranged during the tube working operation being shown in dotted lines;

FIG. 3 is a transverse section taken substantially along the line 3—3 of FIG. 2;

FIG. 4 is a transverse section taken substantially along the line 4—4 of FIG. 2;

DESCRIPTION OF THE PREFERRED EMBODIMENT

Figure 5:
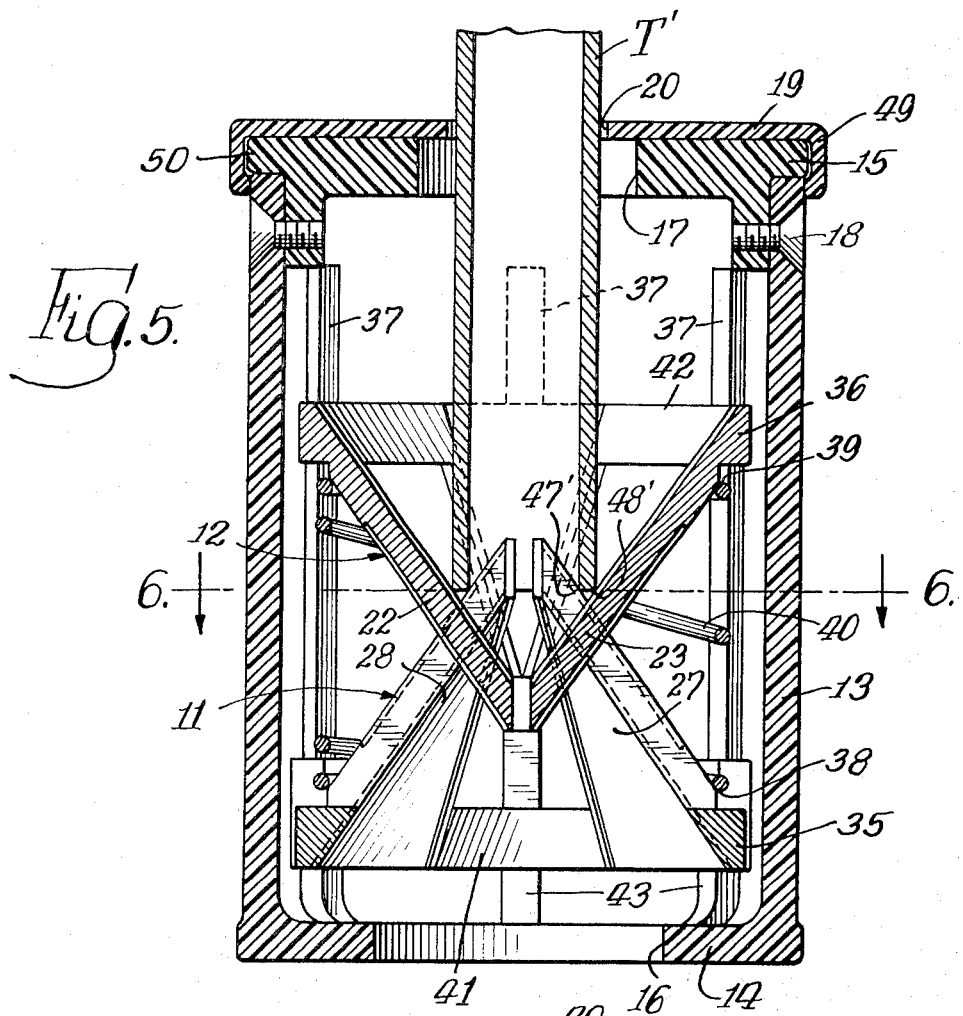
FIG. 5 is a diametric section taken substantially along the line 5—5 of FIG. 2 illustrating the working of a relatively small diameter tube utilizing a removable guide means.
Figure 6:
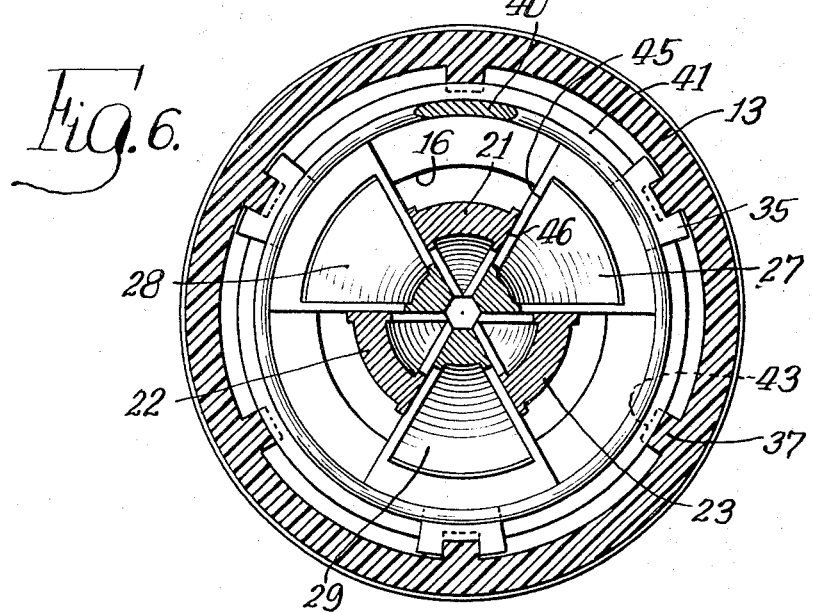
FIG. 6 is a transverse section taken substantially along the line 6—6 of FIG. 5.

In the exemplary embodiment of the invention as shown in the drawing, a tube working tool generally designated 10 is shown to comprise a first cutter generally designated 11 and a similar second cutter generally designated 12 disposed within an outer tubular housing 13 provided with a first end wall 14 and an opposite end wall 15. End wall 14 defines a hole 16 and end wall 15 defines a hole 17 having a diameter different from the diameter of hole 16, each preselected for use in guiding a different diameter end T into working relationship with the cutters 11 and 12, as will be brought out more fully hereinafter.

In the illustrated embodiment, end wall 15 is removably secured to the housing 13 as by suitable screws 18 and a further removable end wall 19 is selectively mounted to end wall 15 to dispose a central opening 20 therein in coaxial alignment with opening 17.

Each of cutters 11 and 12 comprises an open conical arrangement of a plurality of equiangular segments spaced equiangularly apart to define alternating cutting blades and spaces. More specifically, cutter 12 includes three conical segments defining 60° cutter blades 21, 22 and 23, and three 60° spaces 24, 25, and 26 between the respective cutter blades, as best seen in FIG. 3. Cutter 11 defines three 60° cutter blades 27, 28 and 29 spaced apart by three 60° spaces 30, 31 and 32, as best seen in FIG. 4.

As illustrated in FIGS. 2, 3 and 4, the tip portion 33 of cutter 11 is normally interleaved with the tip portion 34 of cutter 12 with the cutter blades 21, 22 and 23 of cutter 12 aligned with the spaces 30, 31 and 32 of the cutter 11, and the cutter blades 27, 28 and 29 of the cutter 11 aligned with the spaces 24, 25 and 26 of the cutter 12.

The cutters are guided for coaxial movement into and from interleaved association with each other by suitable guide portions 35 on cutter 12 and guide portions 36 on cutter 11 cooperating with slidably fitting elongated guide ribs 37 on the inner surface of the housing 13.

Guides 35 and 36 further define spring retainers 38 and 39, respectively, for retaining the opposite ends of a coil spring 40 coaxially between annular enlarged ends 41 and 42 of cutters 11 and 12, respectively. As shown in FIG. 5, guides 35 and 36 including spring retainer portions 38 and 39 are formed integrally with the annular ends, or base portions, of the respective cutters, and the cutter blades comprise integral portions projecting from the annular base portions.

Housing 13 defines, adjacent end 14, a stop shoulder 43 against which annular base portion 41 of cutter 11 abuts in the fully spaced arrangement of the cutter blades, as shown in FIG. 2. Similarly, housing 13 defines an opposite shoulder 44 against which base portion 42 of cutter 12 abuts in the fully spaced disposition. Thus, shoulders 43 and 44 cooperate to limit the spacing apart of the cutters by the spring 40 to the position of FIG. 2 wherein the tips 33 and 34 are slightly interleaved.

The side edges 45 of cutter blades 27, 28 and 29, and the side edges 46 of cutter blades 21, 22 and 23, define tube working cutting edges for selectively reaming and deburring the tube ends depending on the direction of insertion of the particular tube end into the tool 10. Thus, as shown in dotted lines in FIG. 2, where the tube end T is inserted through opening 16 of end wall 14, the inner edge 47 of the tube end engages the edges 46 of the cutter blades 21, 22 and 23, and the outer edge 48 engages the side edges 45 of the cutter blades 27, 28 and 29.

Reversely, when a tube end, such as tube end T', as shown in FIG. 5, is inserted to extend downwardly into engagement with the inner portion of tube cutter 12, the inner cut edge 47' engages the side edges 45' of the cutter blades 27, 28 and 29 of cutter 11, and the outer edge 48' of the tube end T' engages the side edges 46' of the cutter blades 21, 22 and 23 of cutter 12.

Thus, depending on the direction of insertion of the particular tube end coaxially into the tube, the cutters selectively define reaming or deburring tools acting selectively on the inner or outer edge of the cut end of the tube. In each direction of insertion, the tube working operation is similar in that urging of the tube end against the inner surface of the cutter blades of the cutter adjacent that end, urges that cutter into more fully interleaved association with the opposite cutter until the inner edge of the tube cut end engages the outer surface of the opposite cutter so that subsequent coaxial relative rotation between the tube and the tool causes the side edges of the cutter blades to concurrently ream and debur the tube end edges.

The holes 16, 17 and 20 of the respective end walls of the housing 13 are preselected to have diameters corresponding to the diameters of conventional tubes intended to be worked with the tool. Thus, in the illustrated embodiment, hole 16 is adapted for use with a 1-inch diameter tube, hole 17 is adapted for use with a ¾-inch tube, and hole 20 is adapted for use with a ½-inch tube, it being obvious to those skilled in the art that other suitable hole diameters may be employed to provide guiding action for any preselected diameter tubing.

The removable end wall 19 may be provided with an inturned peripheral flange 49 embracing an outturned flange 50 on end wall 15 for facilitated installation and removal of the end wall 19, as desired. Illustratively, different removable end walls 19 may be provided having additional different diameters for use with a wide range of different diameter tubes. The action of the guide holes, such as holes 16, 17 and 20, in maintaining a loose slide fit with the tubing provides a substantially maintained coaxial disposition of the tubing relative to the axis of the interleaved cutters 11 and 12 for improved accurate working of the tube end. As end wall 15 is removably secured to the housing 13, such as by screws 18, the end wall may be readily removed as for replacement of the cutters or spring when desired.

The cutters may be formed of a suitable material, such as steel, which may be hardened to provide long-lasting cutting edges. The housing and end walls may be formed of a suitable strong material, such as molded plastic. Spring 40 may be formed of suitable resilient spring wire, such as music wire, and in the illustrated embodiment, where the spring has a free length of approximately 2½ inches, it may be provided to have a load rate of approximately 2 lbs. per inch.

The tube working operation may be simply effected by inserting the tube end through the hole in the end wall of the housing to urge the cut end of the tube against both sets of cutter blades permitted by the resilient yieldable movement of the engaged cutter and effecting relative coaxial rotation between the tool and the tube as by rotating the tool about the tube end, as illustratively indicated in FIG. 1.

The foregoing disclosure of specific embodiments is illustrative of the broad inventive concepts comprehended by the invention.

I claim:

1. A tool for concurrently reaming the inner edge of a cut tube end and deburring the outer edge of the cut tube end comprising:
    a first cutter having an open conical arrangement of a plurality of equiangular conical segments spaced equiangularly apart to define alternating first cutter blades and first spaces;
    a second cutter having a similar open conical arrangement of said plurality of equiangular conical segments spaced similarly equiangularly apart to define alternating second cutter blades and second cutter spaces, said cutter blades having sharp side edges, said second cutter being coaxially apposed to said first cutter with the large ends of the conical cutters outermost and offset from said first cutter about the common axis thereof to align said first cutter blades of said first cutter with said second spaces of said second cutter, and said second cutter blades of said second cutter with said first spaces of said first cutter; and
    resilient means urging said cutters coaxially apart while permitting a tube end urged coaxially through the large end of either cutter into engagement with the inner surfaces of the cutter blades thereof to move said one cutter into interleaved relationship with the other cutter to a position wherein the inner edges of the cut end of the tube engages the cutter blades of said other cutter, whereby coaxial relative rotation between said tube end and said tool causes concurrent reaming of the inner edge of the cut tube end by said sharp side edges of said other cutter and deburring of the outer edge of the cut tube end by said sharp side edges of said one cutter.

2. The tool of claim 1 wherein said cutters define annular base portions at the large end thereof, said cutter blades being formed integrally with said base portion.

3. The tool of claim 1 wherein said resilient means comprises a coil spring extending coaxially between the large ends of said cutters.

4. The tool of claim 1 including means for limiting the movement of said cutters apart to maintain at least the tips of the cutter blades interleaved.

5. The tool of claim 1 including means for guiding the movement of the cutter by said tube end.

6. The tool of claim 1 wherein said cutters define conical arrangement of three 60° conical blades spaced equiangularly apart 60°.

7. A tool for concurrently reaming the inner edge of a cut tube end and deburring the outer edge of the cut tube end comprising:
    a first cutter having an open conical arrangement of a plurality of equiangular conical segments spaced equiangularly apart to define alternating first cutter blades and first spaces;
    a second cutter having a similar open conical arrangement of said plurality of equiangular conical segments spaced similarly equiangularly apart to define alternating second cutter blades and second cutter spaces, said cutter blades having sharp side edges, said second cutter being coaxially apposed to said first cutter with the large ends of the conical cutters outermost and offset from said first cutter about the common axis thereof to align said first cutter blades of said first cutter with said second spaces of said second cutter, and said second cutter blades of said second cutter with said first spaces of said first cutter;
    resilient means urging said cutters coaxially apart while permitting a tube end urged coaxially through the large end of either cutter into engagement with the inner surfaces of the cutter blades thereof to move said one cutter into interleaved relationship with the other cutter to a position wherein the inner edges of the cut end of the tube engages the cutter blades of said other cutter, whereby coaxialy relative rotation between said tube end and said tool causes concurrent reaming of the inner edge of the cut tube end by said sharp side edges of said other cutter and deburring of the outer edge of the cut tube end by said sharp side edges of said one cutter; and
    means for guiding the tube end coaxially into said engagement with the inner surfaces of the cutter blades of said one cutter.

8. The tool of claim 7 wherein said guiding means comprises wall means defining a guide hole coaxially aligned with said cutters and spaced outwardly from said one cutter a substantial preselected distance when said cutters are in maximum spaced-apart relationship.

9. The tool of claim 7 further including a tubular housing coaxially enclosing said cutters and said guiding means comprises wall means extending across an end of said tubular housing and defining a guide hole coaxially aligned with said cutters and spaced outwardly from said one cutter a substantial preselected distance when said cutters are in maximum spaced-apart relationship.

10. The tool of claim 7 further including a tubular housing coaxially enclosing said cutters and carrying means for guiding the relative coaxial movement between said cutters.

11. The tool of claim 7 wherein said cutters define annular base portions at the large end thereof, said tool further including a tubular housing coaxially enclosing said cutters and cooperating means on said base portions of the cutters and said housing for guiding the relative coaxial movement between said cutters.

12. A tool for concurrently reaming the inner edge of a cut tube end and deburring the outer edge of the cut tube end comprising: a first cutter having an open conical arrangement of a plurality of equiangular conical segments spaced equiangularly apart to define alternating first cutter blades and first spaces; a second cutter having a similar open conical arrangement of said plurality of equiangular conical segments spaced similarly equiangularly apart to define alternating second cutter blades and second cutter spaces, said cutter blades having sharp side edges, said second cutter being coaxially apposed to said first cutter with the large ends of the conical cutters outermost and offset from said first cutter about the common axis thereof to align said first cutter blades of said first cutter with said second spaces of said second cutter, and said second cutter blades of said second cutter with said first spaces of said first cutter; resilient means urging said cutters coaxially apart while permitting a tube end urged coaxially through the large end of one cutter into engagement with the inner surfaces of the cutter blades thereof to move said one cutter into interleaved relationship with the other cutter to a position wherein the inner edges of the cut end of the tube engages the cutter blades of said other cutter, whereby coaxially relative rotation between said tube end and said tool causes concurrent reaming of the inner edge of the cut tube end by said sharp side edges of said other cutter and deburring of the outer edge of the cut tube end by said sharp side edges of such one cutter; and means for guiding the tube end coaxially into said engagement with the inner surfaces of the cutter blades of said one cutter, said guiding means comprising a pair of walls, one each at the opposite outer ends of said cutters, each wall defining a guide hole coaxially aligned with said cutters.

13. The tool of claim 12 wherein said guide hole of one wall has a diameter different from that of the guide hole of the other end wall.

14. A tool for concurrently reaming the inner edge of a cut tube end and deburring the outer edge of the cut tube end comprising: a first cutter having an open conical arrangement of a plurality of equiangular conical segments spaced equiangularly apart to define alternating first cutter blades and first spaces; a second cutter having a similar open conical arrangement of said plurality of equiangular conical segments spaced similarly equiangularly apart to define alternating second cutter blades and second cutter spaces, said cutter blades having sharp side edges, said second cutter being coaxially apposed to said first cutter with the large ends of the conical cutters outermost and offset from said first cutter about the common axis thereof to align said first cutter blades of said first cutter with said second spaces of said second cutter, and said second cutter blades of said second cutter with said first spaces of said first cutter; resilient means urging said cutters coaxially apart while permitting a tube end urged coaxially through the large end of one cutter into engagement with the inner surfaces of the cutter blades thereof to move said one cutter into interleaved relationship with the other cutter to a position wherein the inner edges of the cut end of the tube engages the cutter blades of said other cutter, whereby coaxially relative rotation between said tube end and said tool causes concurrent reaming of the inner edge of the cut tube end by said sharp side edges of said other cutter and deburring of the outer edge of the cut tube end by said sharp side edges of such one cutter; and means for guiding the tube end coaxially into said engagement with the inner surfaces of the cutter blades of said one cutter, said guiding means comprising a wall element defining a guide hole and means for removably mounting the wall element in the tool in coaxial alignment with said cutters and spaced outwardly from said one cutter a substantial preselected distance when said cutters are in maximum spaced-apart relationship.

15. A tool for concurrently reaming the inner edge of a cut tube end and deburring the outer edge of the cut tube end comprising: a first cutter having an open conical arrangement of a plurality of equiangular conical segments spaced equiangularly apart to define alternating first cutter blades and first spaces; a second cutter having a similar open conical arrangement of said plurality of equiangular conical segments spaced similarly equiangularly apart to define alternating second cutter blades and second cutter spaces, said cutter blades having sharp side edges, said second cutter being coaxially apposed to said first cutter with the large ends of the conical cutters outermost and offset from said first cutter about the common axis thereof to align said first cutter blades of said first cutter with said second spaces of said second cutter, and said second cutter blades of said second cutter with said first spaces of said first cutter; resilient means urging said cutters coaxially apart while permitting a tube end urged coaxially through the large end of one cutter into engagement with the inner surfaces of the cutter blades thereof to move said one cutter into interleaved relationship with the other cutter to a position wherein the inner edges of the cut end of the tube engages the cutter blades of said other cutter, whereby coaxially relative rotation between said tube end and said tool causes concurrent reaming of the inner edge of the cut tube end by said sharp side edges of said other cutter and deburring of the outer edge of the cut tube end by said sharp side edges of such one cutter; and means for guiding the tube end coaxially into said engagement with the inner surfaces of the cutter blades of said one cutter, said guiding means comprising first wall means defining a first guide hole coaxially aligned with said cutters and spaced outwardly from said one cutter a substantial preselected distance when said cutters are in maximum spaced-apart relationship, and a second wall means defining a second guide hole having a diameter smaller than that of said first hole and means for removably mounting the second wall means in overlying relationship to said first wall means with said guide holes coaxially aligned.

* * * * *